April 15, 1969    F. E. ROSZTOCZY    3,438,874
FABRICATION OF SOLID THIN FILM CAPACITOR
Filed May 11, 1966

INVENTOR
F. E. ROSZTOCZY
BY
ATTORNEY

United States Patent Office 3,438,874
Patented Apr. 15, 1969

3,438,874
FABRICATION OF SOLID THIN FILM CAPACITOR
Ferenc E. Rosztoczy, Berkeley Heights, N.J., assignor to Bell Telephone Laboratories, Incorporated, Murray Hill, N.J., a corporation of New York
Filed May 11, 1966, Ser. No. 549,306
Int. Cl. C23b 5/52, 5/50
U.S. Cl. 204—37                                    7 Claims

ABSTRACT OF THE DISCLOSURE

A method of making a solid electrolytic capacitor by impregnating the anodized barrier layer with a hydrogen peroxide-manganous nitrate mixture and then pyrolyzing.

---

This invention relates to a technique for the fabrication of film capacitors. More particularly, the present invention relates to a technique for the deposition of manganese oxide semiconductive layers upon film capacitors.

For purposes of exposition, the invention is described in terms of thin film capacitors. However, it will be understood that the technique may be employed in the fabrication of solid electrolytic capacitors utilizing film-forming metal anodes.

Recently, a technique for enhancing the characteristics of thin film capacitors was described by D. A. McLean in copending application, Ser. No. 445,866 filed Mar. 31, 1965, and now abandoned. The technique described therein involved modifying the conventional procedure for the fabrication of printed capacitors by the use of a semiconducting layer of manganese oxide intermediate the anodized electrode and the counter-electrode, so resulting in a device manifesting a capacitance of the order of one microfarad and higher while retaining acceptable breakdown characteristics.

Although the devices described therein have proven satisfactory for most purposes, studies have revealed limitations from the standpoint of dissipation factor. Thus, it has been found that by optimizing process parameters the lowest possible dissipation factor attained by the prior art procedure is approximately 0.04, such values being inadequate in certain device applications.

In accordance with the present invention, the prior art procedure for depositing the manganese oxide layer upon an anodized dielectric is modified by pyrolyzing a solution of manganous nitrate containing hydrogen peroxide, so resulting in enhancement in the dissipation factor of the resultant device.

The invention will be more readily understood from the following detailed description taken in conjunction with the accompaying drawing, wherein.

Figure 1:
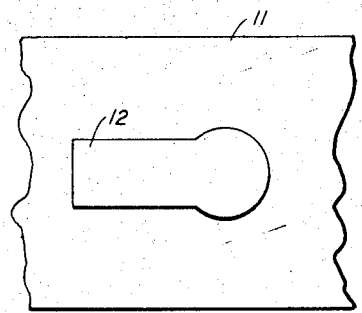
FIG. 1 is a plan view of a substrate with a layer of a film forming metal deposited thereon.
Figure 2:
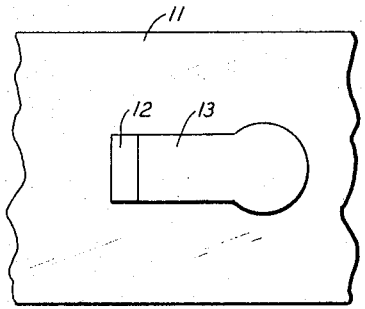
FIG. 2 is a plan view of the body of FIG. 1 after anodization.

With further reference now to FIG. 1, there is shown a substrate 11 upon which a metallic pattern is to be produced in accordance with the present invention. The substrate material employed may be rough in nature and evidence sharp changes in contour, or may be any of the conventional smooth surface substrate materials commonly employed in capacitor fabrication. Preferred substrate materials are glasses, ceramics, etc.

The first step in fabricating a capacitor of the invention involves cleaning the substrate 11 by conventional techniques well known to those skilled in the art. Following the cleaning step, a layer of a film-forming metal 12 is deposited upon substrate 11 by conventional procedures as, for example, cathodic sputtering, vacuum evaporation, etc., as described by L. Holland in "Vacuum Deposition of Thin Films," John Wiley & Sons, 1956. The film-forming metals of interest herein are those whose oxides are known to be excellent dielectric materials and include tantalum, aluminum, niobium, titanium, and zirconium.

For the purposes of the present invention, the minimum thickness of the layer deposited upon the substrate is dependent upon two factors. The first of these is the thickness of the metal, which is converted into the oxide form during the subsequent anodizing step. The second factor is the minimum thickness of unoxidized metal remaining after anodization commensurate with the maximum resistance which can be tolerated in the film-forming electrode. It has been determined that the preferred minimum thickness of the metal electrode is approximately 1,000 A.

Figure 3:
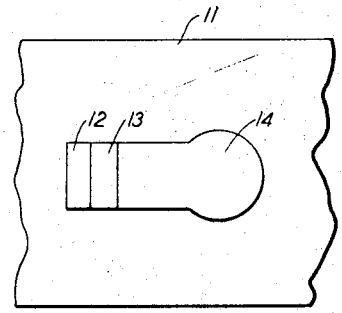
FIG. 3 is a plan view of the body of FIG. 2 after the deposition thereon of a coating of manganese oxide.

The next step in the fabrication of a capacitor in accordance with the invention involves depositing a layer of manganese oxide 14 upon anodic oxide layer 13, shown in FIG. 3. This step is accomplished by coating the body with a solution of from 0.1–50 percent, by weight, manganous nitrate to which has been added from 0.1–10 percent, by weight, hydrogen peroxide (based on the total weight of the solution), the body having been heated to a temperature sufficient to decompose the manganous nitrate to yield manganese oxide. Solvents found suitable in this use are water and methanol.

Studies have revealed that the particular temperature employed during the pyrolysis step is not critical. However, it has been found that satisfactory results occur over a range of temperatures from 500° C. down to 140° C. and lower, optimum results corresponding with a range from 170–210° C. It has been found that the use of temperatures appreciably less than the lower limit fail to cause sufficient decomposition of the manganous nitrate whereas temperatures beyond 500° C. result in excessive evaporation of the solvent.

Coating may be effectively accomplished by spraying with an air brush, by brushing the body to be coated with a cotton swab containing the manganous nitrate solution or by dipping and pyrolyzing in accordance with conventional techniques. However, the spray pyrolysis procedure is particularly advantageous in that it is rapid, accurate, and results in a well-defined coating.

Following the pyrolysis, the coated body may be re-anodized in a manner similar to the initial anodization. The pyrolysis and reanodization procedure may be repeated as often as practical.

Figure 4:
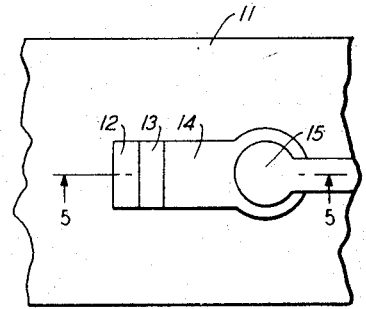
FIG. 4 is a plan view of the body of FIG. 3 after the deposition thereon of a counter-electrode.
Figure 5:
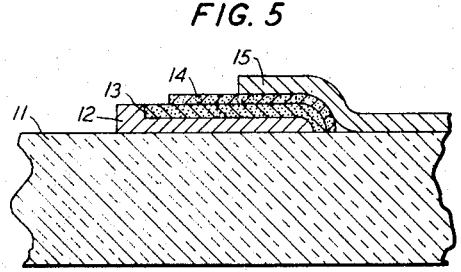
FIG. 5 is a cross-sectional view of the body of FIG. 4.

After obtaining a manganese oxide coating 14 of the required thickness, a metallic counter-electrode 15, shown in FIG. 4, is deposited upon and in intimate contact with the manganese oxide layer. A cross-sectional view of the resultant assembly is shown in FIG. 5.

It is to be understood that the procedure delineated hereinabove is given for purposes of illustration only and not for purposes of limitation. A number of variations may be made, for example, the electrolyte employed in the anodizing and reanodizing steps may be any of the well known electrolytes, etc., without departing from the spirit and scope of the invention. Examples of the present invention are described in detail below:

Example 1

A one inch by three inch glass substrate was cleaned with ultrasonic detergent washes and boiling hydrogen peroxide in accordance with conventional techniques. Thereafter, the substrate was positioned in a cathodic sputtering apparatus and a layer of tantalum 4,500 A. in thickness was deposited. Following, a fifteen capacitor pattern was etched in the deposited film utilizing conventional photo-engraving techniques. Next, the tantalum pattern was anodized in a 0.01 percent aqueous solution of citric acid, a constant current of one milliampere per square centimeter being employed until a voltage of 130 volts was attained. At that point, the assembly was left to anodize for 30 minutes at constant voltage.

Following the anodization, the assembly was back-etched for five seconds at 90 volts in a 0.01 percent solution of aluminum chloride in methanol. Then, the assembly was reanodized for 30 minutes at the original anodizing voltage. A coating of manganese oxide was then applied by inserting the body in a substrate holder, heating to a temperature of 200° C. and spraying an aqueous solution of 2 percent, by weight, manganous nitrate therein and 3 percent, by weight hydrogen peroxide. Following, the sprayed body was reanodized in a 0.03 percent, by weight, acetic acid solution at 90 volts for 30 minutes. Finally, a gold counter-electrode was evaporated through a mask upon the resultant assembly. The completed capacitors were found to evidence an average dissipation factor of approximately 0.018.

For comparative purposes, the described procedure was repeated at various temperatures with water and methanol solvents, the results being set forth in Table I below:

TABLE I

| Solvent | Pyrolysis temp., ° C. | Additive | Average dissipation factor |
|---|---|---|---|
| $H_2O$ | 210 | | 0.04 |
| $H_2O$ | 170-210 | $H_2O_2$ | 0.016-0.020 |
| $H_2O$ | 175 | | 0.04 |
| $H_2O$ | 140-160 | $H_2O_2$ | 0.02 |
| $CH_3OH$ | 160 | | 0.05 |
| $CH_3OH$ | 160 | $H_2O_2$ | 0.03 |

It will be noted by reference to Table I that operation in accordance with the present invention permits a marked improvement in dissipation factor as compared with the prior art technique.

Example 2

A one inch by three inch glass substrate was cleaned with ultrasonic detergent washes and boiling hydrogen peroxide in accordance with conventional techniques. Thereafter, the substrate was positioned in a vacuum evaporation apparatus and a layer of aluminum 5,000 A. in thickness deposited thereon. Next, a fifteen capacitor pattern was etched in the aluminum film utilizing conventional photo-engraving techniques. Following, the aluminum layer was anodized in a 30 percent solution of ammonium pentaborate-ethylene glycol at 130 volts for 30 minutes. A coating of manganese oxide was then applied by inserting the body in a substrate holder, heating to a temperature of 180° C. and spraying an aqueous solution of 2 percent, by weight, manganous nitrate thereon to which had been added 3 percent, by weight, hydrogen peroxide. Following, the sprayed body was re-anodized in a 30 percent, by weight, ammonium pentaborate-ethylene glycol solution at 90 volts for 30 minutes. Finally, a gold counter-electrode was evaporated through a mask beyond the resultant assembly. The completed capacitors were found to evidence an average breakdown voltage of 110 volts and an average leakage current at 75 volts of $5 \times 10^{-9}$ amperes.

For comparative purposes, the described procedure was repeated at various temperatures with water and methanol solvents, the results being set forth in Table II below:

TABLE II

| Solvent | Temp., ° C. | Additive | Average dissipation factor |
|---|---|---|---|
| $H_2O$ | 180 | | 0.04 |
| $H_2O$ | 180 | $H_2O_2$ | 0.0165 |
| $CH_3OH$ | 160 | | 0.04 |
| $CH_3OH$ | 160 | $H_2O_2$ | 0.03 |

Again it will be noted that operating in accordance with the inventive technique results in a substantial improvement in dissipation factor.

While the invention has been described in detail in the foregoing specification and the drawing similarly illustrates the same, the aforesaid is by way of illustration only and is not restrictive in character. It will be readily appreciated by those skilled in the art that although the invention is described in terms of thin films, the described technique may suitably be employed in the fabrication of said electrolytic capacitors utilizing film-forming metal anodes.

What is claimed is:

1. In the method for the fabrication of a solid electrolytic capacitor including an anodized layer of a film-forming metal which comprises depositing a layer of manganese oxide upon said anodized layer and an electrically conductive layer upon said manganese oxide layer, the improvement which comprises forming said manganese oxide layer by coating said anodized layer with a solution containing from 0.1–50 percent, by weight, manganous nitrate, and hydrogen peroxide, said anodized layer having been heated to a temperature sufficient to decompose said manganous nitrate.

2. A method in accordance with claim 1 wherein said anodized layer is formed upon a thin film.

3. A method in accordance with claim 2 wherein said manganese oxide is deposited from an aqueous solution of manganous nitrate.

4. A method in accordance with claim 2 wherein said manganese oxide is deposited from a solution of manganous nitrate in methanol.

5. A method in accordance with claim 2 wherein $H_2O_2$ is present in an amount ranging from 0.1 to 10 percent, by weight, based on the weight of the solution.

6. A method in accordance with claim 3 wherein said film-forming metal is tantalum.

7. A method in accordance with claim 3 wherein said film-forming metal is aluminum.

References Cited

UNITED STATES PATENTS

| 2,005,279 | 6/1935 | Van Geel et al. | 317—233 XR |
| 2,875,384 | 2/1959 | Wallmark | 317—234 |
| 2,993,266 | 7/1961 | Berry | 29—25.42 |
| 3,093,803 | 6/1963 | Schlicke et al. | 333—73 |
| 3,123,894 | 3/1964 | Von Bonin | 204—37 |

HOWARD S. WILLIAMS, Primary Examiner.

W. B. VAN SISE, Assistant Examiner.

U.S. Cl. X.R.

29—25.41; 317—230; 204—14, 38